United States Patent [19]

Jakobi

[11] 4,008,722
[45] Feb. 22, 1977

[54] SHAKER FOR HARVESTER-THRESHER

[75] Inventor: Wilhelm Jakobi, Bogenweiler, Germany

[73] Assignee: Maschinenfabrik Fahr Aktiengesellschaft Gottmadingen, Gottmadingen, Germany

[22] Filed: May 19, 1975

[21] Appl. No.: 578,943

[30] Foreign Application Priority Data

May 20, 1974 Germany ............... 2424520

[52] U.S. Cl. .................. 130/26; 130/DIG. 1
[51] Int. Cl.² ......................... A01F 12/30
[58] Field of Search ........... 130/26, 24, DIG. 1; 209/322, 328–330

[56] References Cited

UNITED STATES PATENTS 264,490   9/1882   Suitt ..................... 130/26
818,009   4/1906   Wood .................... 130/26

Primary Examiner—J.N. Eskovitz
Attorney, Agent, or Firm—Karl F. Ross; Herbert Dubno

[57] ABSTRACT

A harvesting machine having a plurality of vertically reciprocal shaking elements is provided at the top of each of these elements with a distributing plate that extends the full length of the shaking elements and is pivotal about an axis on this shaking element. Each of these distributing plates is oscillated about its respective axis so as to loosen up and order the straw lying on the shaking elements and at the same time to separate grain from them. The plates have sawtoothed upper edges and may be oscillated at a rate equal to three times the vertical reciprocation rate of the shaking elements.

13 Claims, 3 Drawing Figures

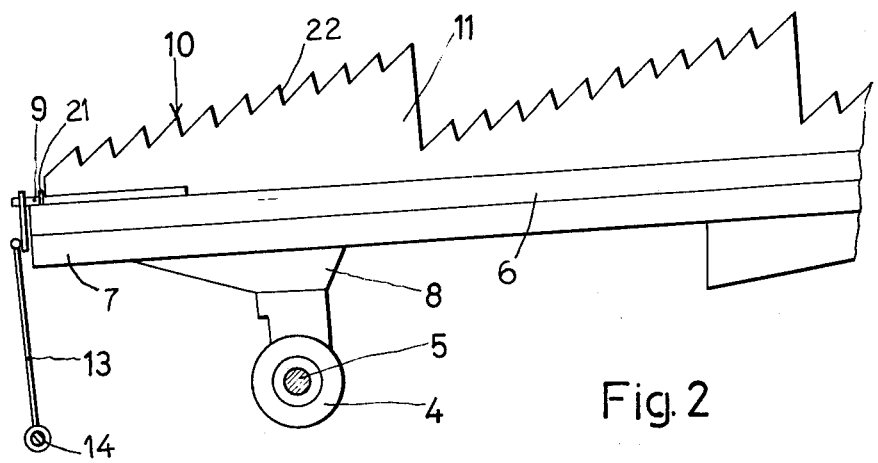
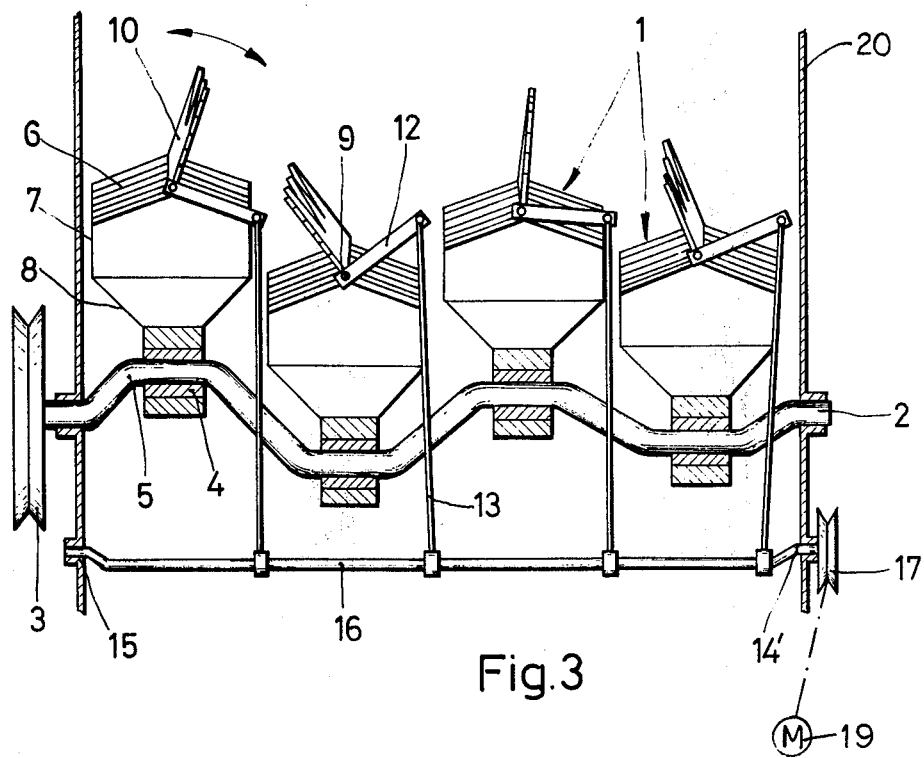

SHAKER FOR HARVESTER-THRESHER

FIELD OF THE INVENTION

The present invention relates to a combine harvester. More particularly this invention relates to a shaker arrangement for a harvester of grain-carrying standing crops such as wheat.

BACKGROUND OF THE INVENTION

In a combine harvester and thresher the standing crop which has been cut and from which much of the grain has been separated is fed back to a shaking screen or reed which lines the stalks of the crop up parallel to each other and shakes any remaining grain from them. Such a harvester-thresher is described on pages 432–433 of *The Way Things Work* (Simon & Schuster: 1967). The straw rack with the shaking screens allows the straw to be formed into a neat windrow making baling easy and at the same time insures that all of the grain will be separated from the stalks.

It is known to provide distributing members above the straw rack at the forward end thereof. These distributing members are tines or wires which are displaceable transverse to the travel direction of the machine and are driven by a drum from which they extend radially so that they not only travel transverse to transport direction but also reciprocate up and down. Such an arrangement serves to loosen up the straw mass somewhat, but often allows wadded masses of straw to travel through the shaking screen, carrying with them valuable grain and making subsequent baling more difficult.

OBJECTS OF THE INVENTION

It is therefore an object of the present invention to provide an improved combine harvester and thresher.

Another object is the provision of improved distributing means for the straw rack or shaking screen of such a machine.

Yet another object is to provide improved means for shaking and loosening up the straw in a combine.

SUMMARY OF THE INVENTION

These objects are attained according to the present invention by providing a flat plate extending above and parallel to each of the shaking elements and means on each of the elements defining a pivot axis for the respective plate which is parallel to the respective element. Operating means is provided for oscillating these plates back and forth pivotally about the respective axes as the shaking elements reciprocate vertically.

According to the present invention, each of these flat plates extends substantially the full length of each of the respective shaking elements so that a loosening up and shaking is effected along the entire length of the shaking screen. In this manner all of the stalks are lined up parallel to each other in the transport direction and any grain caught in the stalks is shaken through and picked up by the grain collector underneath the shaking screen.

According to yet another feature of this invention the operating means has a common operating member in the machine extending at a right angle to the oscillation axes of the distributing plates and a crank having one end fixed to each plate and an opposite end secured to an operating rod which itself is carried on the operating member. Thus as the shaking elements reciprocate vertically relative to the operating member the distributing plates are oscillated back and forth.

It is also within the scope of this invention to displace the operating member. This is effected by forming it as a large crank with end sections journaled in the machine and a center section to which the operating rods are connected. Rotation of this operating member therefore imparts an oscillatory movement to the flat plates even during absence of vertical reciprocation of the shaking element.

According to a further feature of this invention, each of these plates is pivoted at the peak of the roof-like upper surface of the respective shaking element. Each plate has a generally sawtooth-shaped upper edge with the edges of the sawteeth themselves being toothed or serrated.

With the system accoding to the present invention all of the grain as well as small bits of chaff and broken pieces of straw are separated out at the shaking screen so that virtually none of the grain is lost into the windrow formed behind the combine. This lateral shaking is added to the normal longitudinal transport of the straw through the machine so that instead of putting out a disordered windrow the machine is capable of producing a very smooth and easy-to-bale windrow of straw.

According to the present invention, the plates are oscillated back and forth at a frequency at least three times greater than the frequency of vertical reciprocation of the shaking elements. When an oscillation frequency of approximately 1,000 reciprocations per minute is chosen for the flat plates an extremely advantageous vibration and shaking of the straw is obtained. In addition with such an arrangement it is possible to use relatively short oscillation and reciprocation strokes on the plate and shaking elements respectively.

BRIEF DESCRIPTION OF THE DRAWING

The above and other objects, features and advantages of the invention will become more readily apparent from the following description, reference being made to the accompanying drawing in which:

FIG. 2 is a side view of a detail of the apparatus of FIG. 1; and

FIG. 3 is a view similar to FIG. 1 illustrating another arrangement according to the present invention.

SPECIFIC DESCRIPTION

Figure 1:
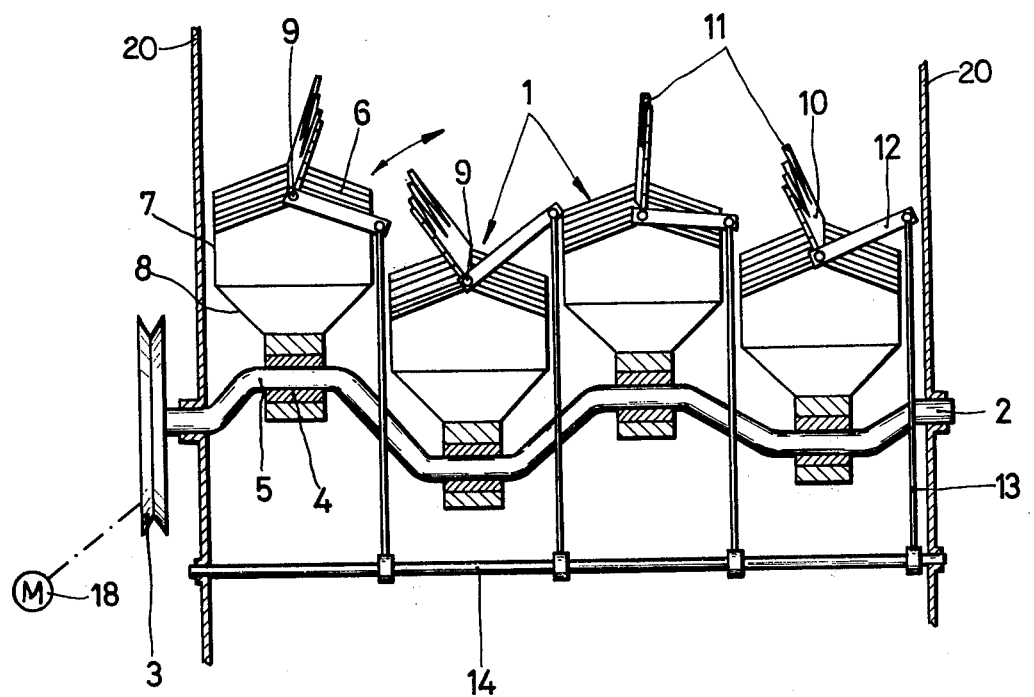
FIG. 1 is a cross section through an apparatus according to the present invention.

A combine harvester as described in the above-identified publication has a frame 20 in which are journaled the ends of a crankshaft 2 having a plurality of eccentrically offset sections 5 on which are mounted bearings 4 at the bottom of a vertically reciprocal shaker element 1. Two such shafts 2 are provided, although only one is shown in FIG. 1, and each is provided on one end with a pulley 3 connected to a motor 18.

Each of the shaking elements 1 has a rooflike upper surface 6 at the central peak of which there is provided a pivot 9 secured in lugs 21 (FIG. 2) and carrying a flat shaker plate 10 having an upper edge formed as a plurality of sawteeth 11 themselves formed with sawtoothed edges 22. Each of the shaker elements 1 additionally has sides 7 which are spaced from the frame 20 and the other sides 7 of the adjoining shaker elements 1 so that grain may drop down between them, and a downwardly tapered bottom 8 having bearings 4 that secure each shaker element to the two cranks 2.

A crank arm 12 is secured to each of the pivot axles 9 and has its outer end secured to the upper end of a tie rod 13 itself secured at its lower end to a rod 14 extending across the housing 20 perpendicular to the direction of travel of this housing 20 and parallel to the axis of rotation of the crank 2. Thus as the motor 18 rotates the crank 2 the shaking elements 1 reciprocate vertically and the links 13 will oscillate the plates 10 back and forth about their axes 9 at a frequency dependent directly on the frequency of vertical reciprocation of these elements 1.

It is also possible according to the present invention to use a shaft 14' having ends journaled at 15 in the housing 20 and a central section 16 that is offset from the axis of rotation of this shaft 14'. A pulley 17 on the end of the shaft 14' is connected to a motor 19 so that, even in the absence of rotation of the shaft 2, rotation of the shaft 14' will oscillate the plates 10 back and forth about their axes 9. According to this invention the shaft 14' is generally driven at a speed equal to at least three times the rotation speed of the shaft 2.

I claim:

1. In a harvesting machine wherein grain-carrying stalks are shaken to separate the grain from the stalks by a plurality of parallel horizontally elongated and vertically reciprocating shaking elements, the improvement comprising:
   a flat plate extending above, all across and parallel to each of said shaking elements,
   means on each of said elements defining a pivot axis for the respective plate parallel to the respective element, and
   operating means for oscillating said plates back and forth pivotally about their respective axes as said shaking elements reciprocate vertically.

2. The improvement defined in claim 1 wherein said operating means includes a crank fixed to each plate and an operating rod having one end fixed to said crank, each plate extending generally the full length of the respective element.

3. In a harvesting machine wherein grain-carrying stalks are shaken to separate the grain from the stalks by a plurality of parallel horizontally elongated and vertically reciprocating shaking elements, the improvement comprising:
   a flat plate extending above and parallel to each of said shaking elements,
   means on each of said elements defining a pivot axis for the respective plate parallel to the respective element, and operating means for oscillating said plates back and forth pivotally about their respective axes as said shaking elements reciprocate vertically, said operating means including:
   a crank fixed to each plate and an operating rod having one end fixed to said crank, each plate extending generally the full length of the respective element; and
   operating means includes a common operating member for said rods extending in said machine at a right angle to said axes, said operating rods each having another end secured to said member.

4. The improvement defined in claim 3 wherein said plates have upper edges formed with a plurality of teeth.

5. The improvement defined in claim 4 wherein said teeth are generally of sawtooth shape.

6. The improvement defined in claim 4 wherein said teeth are generally of sawtooth shape.

7. The improvement defined in claim 3 wherein said operating means includes means for orbiting said member about an axis parallel to and offset from said member, whereby said plates are oscillated at a rate determined by the reciprocation rate of said elements and the rotation speed of said member.

8. The improvement defined in claim 7 wherein said operating member is a rod having a pair of coaxial end sections journaled in said machine and a straight center section offset from said end sections and connected to said other ends of said operating rods.

9. In a harvesting machine wherein grain-carrying stalks are shaken to separate the grain from the stalks by a plurality of parallel horizontally elongated and vertically reciprocating shaking elements, the improvement comprising:
   a flat plate extending above and parallel to each of said shaking elements,
   means on each of said elements defining a pivot axis for the respective plate parallel to the respective element, and
   operating means for oscillating said plates back and forth pivotally about their respective axes as said shaking elements reciprocate vertically, said operating means including:
   a crank fixed to each plate and an operating rod having one end fixed to said crank, each plate extending generally the full length of the respective elements, said shaking elements each having an upwardly peaked rooflike upper surface with a central peak, the oscillation axis of each plate being provided generally at the respective peak.

10. The improvement defined in claim 9 wherein said upper surfaces are upwardly inclined in a transport direction, said axes of oscillation of said plates being similarly upwardly inclined.

11. The improvement defined in claim 9 wherein said plates have upper edges formed with a plurality of teeth.

12. The improvement defined in claim 11 wherein said teeth are generally of sawtooth shape.

13. The improvement defined in claim 12 wherein the edges of said teeth are toothed.

* * * * *